United States Patent
Gröger (10) Patent No.: US 11,590,818 B2
(45) Date of Patent: Feb. 28, 2023

(54) CONTROL DEVICE FOR A VEHICLE AND VEHICLE WITH SAID TYPE OF CONTROL DEVICE

(71) Applicant: WABCO GMBH, Hannover (DE)

(72) Inventor: Jens Gröger, Hannover (DE)

(73) Assignee: ZF CV Systems Hannover GmbH, Hannover (DE)

( * ) Notice: Subject to any disclaimer, the term of this patent is extended or adjusted under 35 U.S.C. 154(b) by 799 days.

(21) Appl. No.: 16/489,879

(22) PCT Filed: Feb. 19, 2018

(86) PCT No.: PCT/EP2018/053977
§ 371 (c)(1),
(2) Date: Aug. 29, 2019

(87) PCT Pub. No.: WO2018/158095
PCT Pub. Date: Sep. 7, 2018

(65) Prior Publication Data
US 2019/0381851 A1    Dec. 19, 2019

(30) Foreign Application Priority Data
Mar. 3, 2017 (DE) ...................... 10 2017 002 061.2

(51) Int. Cl.
*B60G 17/019* (2006.01)
*G01B 7/14* (2006.01)

(52) U.S. Cl.
CPC .............. *B60G 17/019* (2013.01); *G01B 7/14* (2013.01); *B60G 2400/10* (2013.01); *B60G 2800/914* (2013.01)

(58) Field of Classification Search
CPC .......... B60G 17/01908; B60G 2204/11; B60G 2800/91; B60G 17/0195; B60G 17/019;
(Continued)

(56) References Cited

U.S. PATENT DOCUMENTS

| 4,914,610 | A | * | 4/1990 | Shimizu | .................. | G01B 7/00 |
| | | | | | | 73/1.79 |
| 6,293,562 | B1 | * | 9/2001 | Kutscher | .............. | B60G 17/016 |
| | | | | | | 280/5.514 |

(Continued)

FOREIGN PATENT DOCUMENTS

| DE | 3842484 A1 | 6/1990 |
| DE | 10114504 A1 | 10/2002 |

(Continued)

OTHER PUBLICATIONS

Computer-generated English translation of WO2015/169418 to Lulfing generated on Jun. 28, 2022 (Year: 2022).*

(Continued)

*Primary Examiner* — Paul N Dickson
*Assistant Examiner* — Tiffany L Webb
(74) *Attorney, Agent, or Firm* — Warner Norcross + Judd LLP (57) ABSTRACT

A control device for a vehicle is provided. The vehicle comprises vehicle axles, a chassis, and at least two sensor modules. The control device comprises an energy supply unit. The control device is configured to supply energy to the at least two sensor modules via the energy supply unit. The at least two sensor modules are permanently connected to one of the vehicle axles of the vehicle. A vehicle is also provided. The vehicle comprises vehicle axles, a chassis, a sensor arrangement, and a control device comprising an energy supply unit. The sensor arrangement comprises at least two sensor modules which are permanently connected to the vehicle axle and each comprise a supply connection for providing energy into the respective sensor module.

17 Claims, 2 Drawing Sheets

(58) Field of Classification Search
CPC .......... B60G 2400/10; B60G 2800/914; G01B 7/00; G01B 7/14; B60R 16/03; G08C 19/00
See application file for complete search history.

(56) References Cited

U.S. PATENT DOCUMENTS

| | | | | |
|---|---|---|---|---|
| 6,312,065 | B1* | 11/2001 | Freitag | B60T 7/122 303/186 |
| 6,418,363 | B2* | 7/2002 | Cochofel | G05D 1/0891 280/5.513 |
| 6,943,669 | B2 | 9/2005 | Otterbach et al. | |
| 7,267,331 | B2 | 9/2007 | Holbrook et al. | |
| 8,552,741 | B2* | 10/2013 | Wuidart | B60C 23/0413 327/522 |
| 8,917,782 | B2 | 12/2014 | Wang et al. | |
| 9,702,349 | B2* | 7/2017 | Anderson | B60G 17/052 |
| 9,871,559 | B2 | 1/2018 | Koeppendoerfer et al. | |
| 10,040,330 | B2* | 8/2018 | Anderson | B60G 17/019 |
| 10,247,580 | B2 | 4/2019 | Wiest et al. | |
| 10,252,594 | B2* | 4/2019 | D'Amato | B60G 17/018 |
| 10,406,884 | B2* | 9/2019 | Oakden-Graus | B60G 17/01933 |
| 10,814,688 | B2* | 10/2020 | Giovanardi | F16K 31/12 |
| 2001/0005803 | A1 | 6/2001 | Cochofel et al. | |
| 2008/0298226 | A1 | 12/2008 | Mizutani | |
| 2014/0117598 | A1* | 5/2014 | May | B60G 17/019 267/64.27 |
| 2017/0261353 | A1 | 9/2017 | Grundker et al. | |
| 2020/0384823 | A1* | 12/2020 | Shukla | B60G 17/052 |

FOREIGN PATENT DOCUMENTS

| | | | |
|---|---|---|---|
| DE | 102007001573 | A1 | 7/2008 |
| DE | 602004010657 | T2 | 12/2008 |
| DE | 102013202120 | A1 | 8/2013 |
| DE | 102013012368 | A1 | 1/2015 |
| DE | 102013217958 | A1 | 3/2015 |
| DE | 102014216246 | A1 | 2/2016 |
| DE | 102014013356 | A1 | 3/2016 |
| DE | 102016203966 | A1 | 9/2017 |
| EP | 2755039 | A1 | 7/2014 |
| EP | 2846128 | B1 | 3/2016 |
| FR | 2853171 | A1 | 10/2004 |
| WO | 2009138687 | A2 | 11/2009 |
| WO | WO-2015169418 | A1 * | 11/2015 ............ B60T 13/683 |

OTHER PUBLICATIONS

English translation of International Search Report for PCT/EP2018/053977 dated Jan. 6, 2018, 3 pages.
Machine assisted English translation of DE3842484A1 obtained from https://patents.google.com on Aug. 28, 2019, 5 pages.
Machine assisted English translation of FR2853171A1 obtained from https://worldwide.espacenet.com on Aug. 28, 2019, 13 pages.
Machine assisted English translation of DE102007001573A1 obtained from https://patents.google.com on Aug. 28, 2019, 5 pages.
Machine assisted English translation of EP2755039A1 obtained from https://patents.google.com on Aug. 28, 2019, 8 pages.
Machine assisted English translation of DE102013217958A1 obtained from https://patents.google.com on Aug. 28, 2019, 7 pages.
Machine assisted English translation of EP2846128B1 obtained from https://patents.google.com on Aug. 28, 2019, 12 pages.
Machine assisted English translation of DE102016203966A1 obtained from https://patents.google.com on Aug. 28, 2019, 10 pages.

* cited by examiner

CONTROL DEVICE FOR A VEHICLE AND VEHICLE WITH SAID TYPE OF CONTROL DEVICE

CROSS-REFERENCE TO RELATED APPLICATIONS

This application is a national phase entry of PCT/EP2018/053977, filed Feb. 19, 2018, which claims priority to German Patent Application No. 10 2017 002 061.2, filed Mar. 3, 2017, both of which are incorporated herein by reference in their entirety.

FIELD OF THE DISCLOSURE

The disclosure relates to a control device for a vehicle, in certain embodiments, a utility vehicle, and to a vehicle with the control device.

BACKGROUND

A multiplicity of sensors and/or sensor modules can be provided for acquiring movement dynamics parameters of a vehicle. The sensors in this context measure, in particular, components which move and can be adjusted while the vehicle is being driven and the sensors output the measured data by employing signals to control devices of one or more regulating systems in the vehicle, which regulating systems process the signals for different applications. Therefore, a rotational speed sensor can be provided on one vehicle axle in order to acquire the rotational behavior of a wheel on this vehicle axle and react correspondingly to the acquired rotational behavior, for example within the scope of a blocking prevention process. Furthermore, ride height sensors can be used to determine a relative position of a chassis of the vehicle with respect to the vehicle axle of the vehicle. Both sensors or components of these sensors which are mentioned by way of example are arranged on the vehicle axle of the vehicle in order to be able to acquire the respective movement dynamics parameters.

For example, a rotational speed sensor of this type is described in DE 10 2014 013 356 A1, wherein the rotational speed sensor is permanently connected to the vehicle axle at a position at which the rotational behavior of the respective wheel can be acquired. For this purpose, for example a Hall sensor, which is permanently connected to the vehicle axle and which can detect a rotational movement of an impulse wheel which rotates along with the corresponding wheel, is provided in the rotational speed sensor. Furthermore, the rotational behavior of the respective wheel can then be calculated.

In EP 2 846 128 B1, for example a ride height sensor is shown which has a chassis module which is permanently connected to the chassis, and an axle module which is permanently connected to the vehicle axle, between which chassis module and axle module a distance can be measured in a contactless fashion. For this purpose, a low-frequency magnetic field, which is sensed by a receiver coil in the axle module, is generated by a transmitter coil in the chassis module. The induction voltage which is generated in the receiver coil as a result of the alternating field is a measure of the receiver field strength which is still acting on the receiver coil and which is in turn a measure of the distance between the transmitter coil and receiver coil, given knowledge of the original transmission field strength on the transmitter coil. This measure of the distance can be transmitted in a wireless fashion to the chassis module via a high-frequency radio link, for further processing in the vehicle.

In order to be able to bring about a measurement of the respective movement dynamics parameters in both sensor designs, in particular the sensor components and/or sensor modules which are permanently connected to the vehicle axle are to be supplied with energy via supply connections, since actively operated components are present in each case. This can be ensured as described in EP 2 846 128 B1, for example by employing a battery or an accumulator which is integrated into the axle module, but which accumulator or battery only has a limited durability and temperature-resistance.

Furthermore, the sensor module which is permanently connected to the vehicle axle in DE 10 2014 013 356 A1 can be supplied with energy from an energy supply unit which is permanently connected to the chassis, wherein for this purpose a corresponding supply line is to be laid from the chassis to the sensor module which is permanently connected to the vehicle axle. As a result of the frequent movement between the chassis and the vehicle axle during the driving operation, a supply line should be used which essentially maintains its conductivity over a relatively long time period despite frequent movements.

The energy supply of two or even more sensor modules of this type which are attached to the vehicle axle is therefore provided separately from an energy supply unit assigned individually to each sensor module, e.g. in a control device, via a supply line for each sensor module, even if both sensor modules are attached to the same vehicle axle. As a result, the expenditure on the transmission of energy to the vehicle axle is increased.

An object of the disclosure is therefore to make available a control device and a vehicle with a control device, with which vehicle and control device a reliable and cost-effective supply of energy to sensor modules on a vehicle axle can be ensured in a simple way.

BRIEF SUMMARY

A control device for a vehicle is provided. The vehicle comprises vehicle axles, a chassis, and at least two sensor modules. The control device comprises an energy supply unit. The control unit is configured to supply energy to the at least two sensor modules via the energy supply unit. The at least two sensor modules are permanently connected to one of the vehicle axles of the vehicle.

A vehicle is also provided. The vehicle comprises vehicle axles, a chassis, a sensor arrangement, and a control device comprising an energy supply unit. The sensor arrangement comprises at least two sensor modules which are permanently connected to the vehicle axle of the vehicle and each comprise a supply connection for providing energy into the respective sensor module. The supply connection of one of the at least two sensor modules is energy-conductively connected to the energy supply unit of the control device in order to supply energy to the one sensor module which is permanently connected to the vehicle axle. The supply connection of a further of the at least two sensor modules which is permanently connected to the vehicle axle is also energy-conductively connected to the energy supply unit of the control device in order to supply energy at the same time, via the same energy unit of the control device, to the at least two sensor modules which are permanently connected to the vehicle axle.

BRIEF DESCRIPTION OF THE DRAWING

The disclosure is described in greater detail below with reference to the accompanying figures, in which.

DETAILED DESCRIPTION

With reference to the specific embodiment of the figures, wherein like numerals generally indicate like parts throughout the several views, a control device and a vehicle are provided herein.

According to the disclosure there is accordingly a provision that at the same time at least two sensor modules may be supplied with energy via an energy supply unit which is arranged in a control device in a vehicle, wherein the at least two sensor modules may be permanently connected to one of the vehicle axles of the vehicle.

This can already provide the advantage that it is not necessary to supply energy to each of the sensor modules, arranged on the vehicle axle, from different energy supply units but instead an energy supply unit which is already present in a control device, for example a brake control device for actuating brakes of the vehicle or a ride level control device for actuating an air spring system for raising or lowering a chassis of the vehicle, can be provided at the same time to supply energy to a plurality of sensor modules which are attached to the vehicle axle. As a result, in certain embodiments, there can be a saving in terms of components and expenditure on cabling.

The sensor modules which are attached to the vehicle axle are in this context, for example, a rotational speed sensor for measuring a rotational behavior of a wheel on the vehicle axle or an axle module of a ride height sensor, in certain embodiments, of a contactless RF ride height sensor, for measuring a variable which characterizes a distance between the chassis and the vehicle axle of the vehicle, or an acceleration sensor.

As a result it is advantageously recognized that a control unit which is assigned to a specific control function in the vehicle and which has an energy supply unit does not necessarily have to be used to supply energy only to sensor modules which may be also necessary for this control function. Accordingly, there can be provision, for example, to supply energy via the energy supply unit in the brake control device to the rotational speed sensor which is provided for the braking function but also at the same time to the axle module of the ride height sensor, which is not required per se for the braking function. Alternatively, this can also occur from the ride level control device, which does not require the rotational speed sensor for ride level control in a normal case.

There can advantageously be a saving in terms of further components if this simultaneous supply of energy to the sensor modules takes place via just one supply line, at least in certain areas. If the control device is accordingly arranged on the chassis, the region between the chassis and the vehicle axle can be bridged by employing just one supply line. As a result, there can advantageously be a saving in terms of costs since the supply line in this area is subjected to particular loading and therefore a particularly load-stable and therefore costly supply line has to be selected, for example a supply line with copper-sheathed steel stranded conductors in order to ensure permanently good conductivity at the same time as high load stability. As a result, it is possible to absorb frequent deformations of the supply line which occur as a result of the frequently occurring movements between the chassis and the vehicle axle, in certain embodiments, during the driving operation of the vehicle. It can therefore be ensured that the conductivity of the supply line in this area does not change decisively over time, and transmission of energy from the chassis to the vehicle axle is also ensured over a plurality of deformation cycles, for example during the entire service life of the respective sensor module. If energy can be supplied at the same time to two or more of the sensor modules with just one supply line of this type, this can permit a saving in costs.

In various embodiments, this supply line is embodied with two conductors. As a result, simple transmission of current and voltage can be ensured, wherein it can also be advantageously achieved that via this supply line it is also possible to transmit signals which can be output by one of the at least two sensor modules for further processing by e.g. the control device according to the disclosure. The signals are generated here with a specific data protocol, for example by employing modulating a current which is transmitted via the supply line and with which the sensor modules are also supplied with energy. A transmission of data can therefore also easily be ensured via one and the same supply line, in addition to the supply of energy, as a result of which the expenditure on cabling can be reduced further and the transmission of data can be simplified.

The sensor modules may be configured in this case in such a way that the energy which is taken up by the sensor modules, i.e. the current which is required for the supply of energy, does not significantly influence the transmission of data. For example, the axle module of the ride height sensor requires very much less current that the rotational speed sensor, so that the tapping of the current from the supply line by the axle module of the ride height sensor does not significantly influence the signal quality of the rotational speed signals which are output by the rotational speed sensor via the supply line and which are generated by modulating the current which is transmitted at the same time, and accordingly the signals can be transmitted without significant information losses to the control device for further processing.

The control device may be also connected to a, for example, central energy source in the vehicle, e.g. a vehicle battery or a dynamo, in order to permit the sensor modules to be supplied via the energy supply unit in the control device, wherein for this purpose the energy supply unit correspondingly converts or adapts the energy made available by the central energy source, so that the energy can be used to supply energy to the sensor modules on the vehicle axle.

The vehicle according to the disclosure has a sensor arrangement composed of at least two sensor modules which are permanently connected to the vehicle axle, wherein these sensor modules can be supplied with energy at the same time by the energy supply unit of the control device in the way described above. Each of the sensor modules has for this purpose a supply connection via which the energy can be fed into the corresponding sensor module. For this purpose, the supply connection is, in certain embodiments, connected in an energy-conducting fashion at least in certain areas to the energy supply unit via the just one supply line which connects the chassis to the vehicle axle.

The feeding of energy can occur in different alternatives, wherein in all the alternatives the supply line runs between a first fixed point which is permanently connected to the chassis, and a second fixed point which is permanently connected to the vehicle axle. That is to say the first fixed point may essentially follow the movement of the chassis, and the second fixed point follows the movement of the vehicle axle.

According to one advantageous embodiment there is provision that sensor module lines lead from the second fixed point to the respective supply connections on the at least two sensor modules. The sensor module lines accordingly also may essentially follow the movement of the vehicle axle through the fixed connection of the lines to the supply connections and to the second fixed point.

As a result, an energy-conducting connection on the vehicle axle can easily be formed between the second fixed point and the respective supply connections on the at least two sensor modules, in order to ensure a supply of energy thereto. In this embodiment, the second fixed point is arranged on the other side of the sensor modules and is embodied as a type of branch point on the vehicle axle, from which branch point the energy is distributed to the individual sensor modules via the sensor module lines.

For this purpose, the second fixed point can be embodied in the form of a plug-type connector. The supply line and the respective sensor module lines leading to the supply connections can easily be plugged together at the second fixed point. This provides a possibility of simple retrofitting or replacement, since in the case of an expansion or replacement of individual sensor modules the respective sensor module line can be removed from the plug-type connector and/or plugged in.

However, alternatively it is also possible to provide a soldered connection on the second fixed point, wherein the supply line and the sensor module lines leading to the respective sensor modules are soldered at the second fixed point.

According to one alternative embodiment, the second fixed point can also be located in or on one of the sensor modules, for example the rotational speed sensor, and therefore be integrated into the one sensor module. The supply line is for this purpose connected directly to the supply connection of the respective sensor module, so that the supply line may be permanently connected to the supply connection via the connecting point, and thus also to the vehicle axle via the respective sensor module.

In order to supply energy also to further sensor modules on the vehicle axle in this alternative, the sensor module which may be connected in an energy-conducting fashion to the supply line has a branch connection, wherein the branch connection is connected in an energy-connecting fashion to the supply connection. The supply connections on the further sensor modules on the same vehicle axle are connected to the branch connection via the sensor module lines, in order to permit a supply of energy to the one or other sensor modules from the energy supply unit via the supply line and the second fixed point.

Therefore, passing of energy to the other sensor modules can be easily ensured also via the second fixed point which is integrated into one of the sensor modules, so that a sensor module which is already present in the vehicle, on the vehicle axle, for example the rotational speed sensor which is already supplied with energy via a load-stable supply line, only has to be equipped with one branch connection, which can be embodied, for example, as a branching point which can be plugged into the supply connection. Via the branching point it is then possible to supply energy to further sensor modules which are arranged on the vehicle axle, for example the axle module of the ride height sensor, or a further rotational speed sensor on the opposite wheel or an acceleration sensor. It is therefore easily possible to supply energy to two different types of sensor on one vehicle axle via just one supply line.

The branch connection and the supply connection can advantageously also be combined on the respective sensor module so that the supply line and the sensor module lines run at a position into or out of the respective sensor module and the possibility of retrofitting is facilitated.

Figure 1:
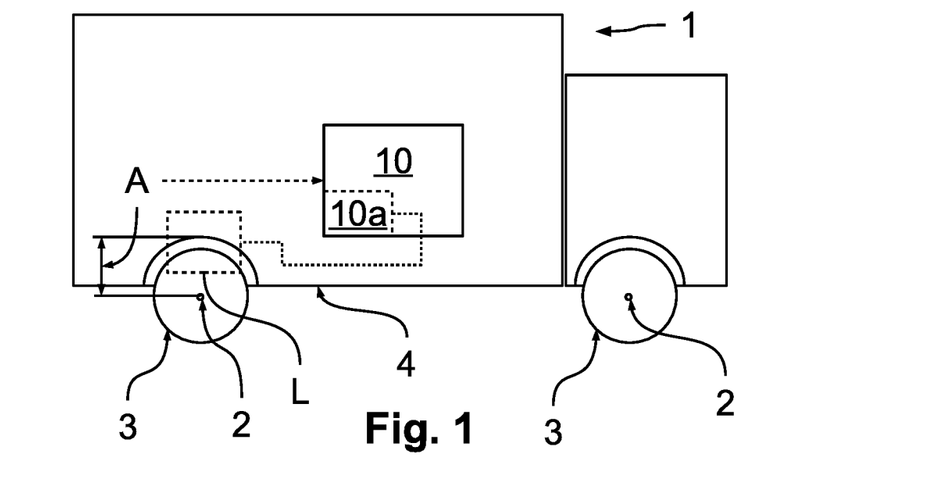
FIG. 1 shows a schematic view of a vehicle.

According to FIG. 1, a vehicle 1, for example a utility vehicle, is illustrated schematically with two vehicle axles 2, on each of which wheels 3 are arranged. A chassis 4 of the vehicle 1 is vertically adjustable with respect to the vehicle axles 2 and/or with respect to the wheels 3 by employing a ride level control system 10, wherein the ride level control system 10 can adjust a distance A between the chassis 4 and the respective vehicle axle 2 or a variable which characterizes the distance A, for example as a function of a load and/or of the current driving conditions under the control of a ride level control device 10a via an air spring system L, in that the chassis 4 is raised or lowered with respect to the vehicle axle 2.

Figure 2:
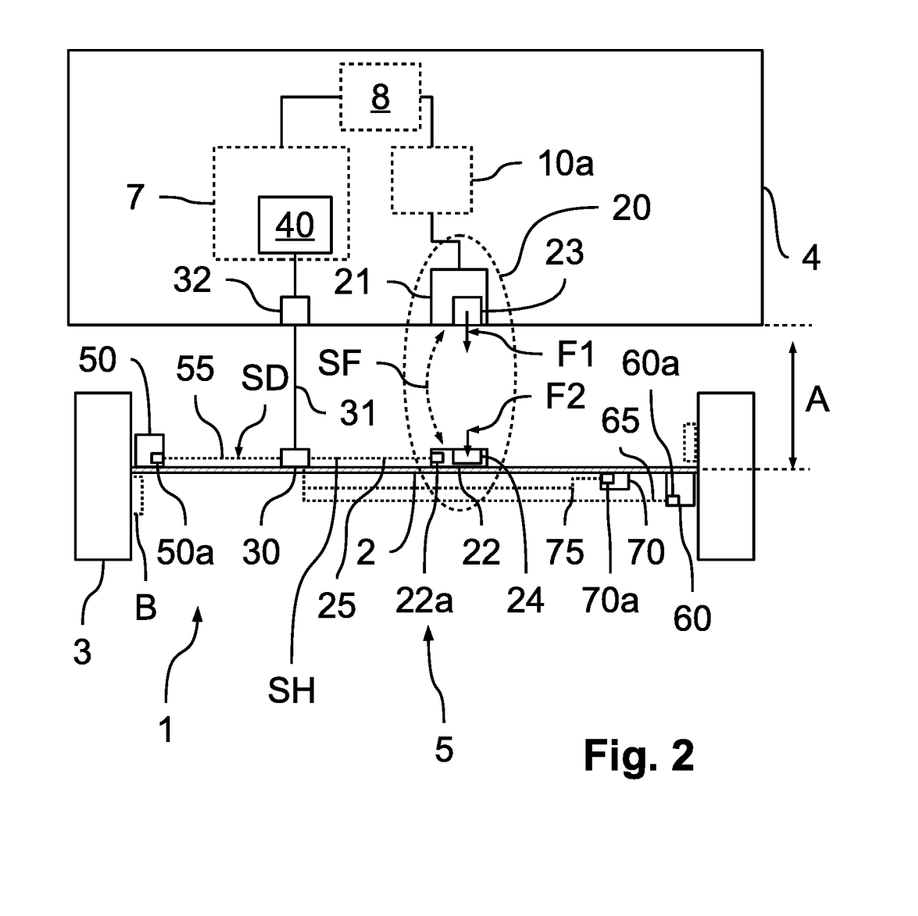
FIG. 2 shows a first embodiment of a sensor arrangement according to the disclosure.

The distance A can be measured by a ride height sensor 20 which has, according to FIG. 2, a chassis module 21 which is fixed to the chassis and an axle module 22 which is fixed to the axle and between which chassis module 21 and axle module 22 the distance A or a variable which characterizes the distance A can be determined in a contactless fashion, wherein the distance from the ride level control system 10 is used as a control variable in the ride level control device 10a. Within the scope of the disclosure, fixed to the axle is understood here to mean that there is a permanent connection to the vehicle axle 2, if appropriate also via further components which are likewise permanently connected to the vehicle axle 2, i.e. the movement of the vehicle axle 3 is directly followed. Fixed to the chassis is correspondingly understood to mean that there is a permanent connection to the chassis 4, if appropriate also via further components which are likewise permanently connected to the chassis 4, i.e. the movement of the chassis 4 is directly followed.

According to this embodiment, the ride height sensor 20 is embodied as an RF ride height sensor (RF, radio frequency), wherein for this purpose a transmitter coil 23 is arranged in the chassis module 21, and a receiver coil 24 is arranged in the axle module 22. A low-frequency magnetic field with a transmission field strength F1 is generated at the transmitter coil 23. The receiver coil 24 measures how high a receiver field strength F2 which is still acting at the axle module 22 is. From the distance between the transmission field strength F1 and the receiver field strength F2, the distance A between the two coils 23, 24 or between the chassis module 21 and the axle module 22 of the ride height sensor 20 can be derived.

The transmission of information from the axle module 22 to the chassis module 21 and vice versa occurs via a high-frequency, bidirectional radio link between the two modules 21, 22. In order to form the radio link, in each case a radio transmission device (not illustrated) is arranged on the chassis module 21 and on the axle module 22, which radio transmission devices can each transmit and receive a high-frequency radio signal SF with previously processed data, e.g. the field strengths F1, F2 or the distance A.

In this context, the distance A which is determined on the axle module 22 from the transmission field strength F1 and the receiver field strength F2 can be transmitted via the radio signal SF to the chassis module 21. In order to determine the distance A on the axle module 22, the transmission field strength F1 can in turn be transmitted from the chassis module 21 in advance to the axle module 22 via the high-frequency radio link. Alternatively, it is also possible to transmit only the receiver field strength F2, measured by the axle module 22, to the chassis module 21 via the radio signal SF and to correspondingly further process the radio signal SF on the chassis module 21 or by the ride level control device 10a in the ride level control system 10.

Alternatively, the functions of the respective modules 21, 22 can also be interchanged, i.e. the transmitter coil 23 is arranged in the axle module 22, and the receiver coil 24 is arranged in the chassis module 21. The transmission and processing of the data occur in a corresponding way.

In order to permit processing of data and transmission of data as well as operation of the transmitter coil 24 in order to measure the receiver field strength F2 and/or the transmitter coil 23 for generating the transmission field strength F1 in the axle module 22 which is arranged on the vehicle axle 2, the axle module 22 is to be supplied with energy.

According to a first embodiment which is illustrated in FIG. 2, the supply of energy occurs via an axle module line 25, which runs between an axle module supply connection 22a on the axle module 22 of the ride height sensor 20 and a second fixed point 30 which is fixed to the axle and which is assigned to a supply line 31. The axle module line 25 therefore connects the sensor module, fixed to the axle, of the ride height sensor 20—the axle module 22—to the second fixed point 30, fixed to the axle, of the supply line 31.

The supply line 31 runs from the second fixed point 30 to a first fixed point 32 which is fixed to the chassis and is connected to an energy supply unit 40 which is also fixed to the chassis. Therefore, an energy-conducting junction is provided between the chassis 4 and the vehicle axle 2, which junction permits the transmission of energy from the energy supply unit 40 which is fixed to the chassis via the first fixed point 32 which is fixed to the chassis to the second fixed point 30 which is fixed to the axle and from there, in certain embodiments, to the axle module 22 which is fixed to the axle.

The supply line 31 is embodied between the second fixed point 30 and the first fixed point 32 in such a way that movements which frequently occur during driving, e.g. vibrations, between the chassis 4 and the respective vehicle axle 2 and deformation of the supply line 31 which occurs repeatedly as a result thereof do not bring about rupture of the supply line 31, i.e. a load-stable supply line 31 is provided which also may essentially retain its conductivity over a long service life despite repeated deformations. For this purpose, the supply line 31 can have, for example, copper-sheathed steel stranded conductors as energy-conducting wires.

According to the embodiment in FIG. 2, an active rotational speed sensor 50 with a rotational speed sensor supply connection 50a is provided as a further sensor module which is fixed to the axle, on the vehicle axle 2, via which rotational speed sensor supply connection 50a the rotational speed sensor 50 can be supplied with energy by the energy supply unit 40 which may be fixed to the chassis. In order to ensure a supply of energy, the rotational speed sensor line 55, which ensures there is an energy-conducting connection between the two points 30, 50a which may be fixed to the axle, is connected between the rotational speed sensor supply connection 50a and the second fixed point 30, fixed to the axle, of the supply line 31.

The rotational speed sensor 50 measures, for example by employing a Hall sensor which is fixed to the axle, the rotation of an impulse wheel which is arranged on the adjacent wheel 3, in order thereby to acquire the rotational behavior of the wheel 3. A rotational speed signal SD which characterizes the rotational behavior of the wheel 3 can be output by the rotational speed sensor 50 via the rotational speed sensor line 55 and the supply line 31 for further processing, for example for brake slip control or traction control, coordinated by a brake control device 7 on the chassis 4, in the vehicle 1, on the basis of which brake slip control or traction control brakes B on the wheels 3 of the vehicle 1 are actuated.

The energy supply unit 40 therefore supplies energy both to the rotational speed sensor 50 and to the part of the ride height sensor 20 which may be permanently connected to the vehicle axle 2, i.e. the axle module 22, so that a common energy supply unit 40 is formed. The energy supply unit 40 for supplying energy to the two sensor modules 50, 22 which are permanently connected to the vehicle axle 2 is, according to FIG. 2, a component of the brake control device 7. The brake control device 7, like the ride level control device 10a as well, is supplied with energy by a superordinate energy source 8, e.g. a vehicle battery or a dynamo of the vehicle 1. Alternatively, the energy supply unit 40 can also be a component of the ride level control device 10a, in order to ensure that there is a supply of energy from the latter to the two sensor modules 50, 22 which may be fixed to the axle.

The second fixed point 30 which may be fixed to the axle therefore serves according to this embodiment as a central branching point via which the energy which is transmitted by the energy supply unit 40 via the load-stable supply line 31 to the branching point on the vehicle axle 2 is distributed via the corresponding sensor module lines 25, 55 to the respective supply connections 22a, 50a of the two sensor modules 22, 50 which may be fixed to the axle. The energy supply unit 40 and the supply line 31 therefore serve in this case for simultaneously supplying energy to two sensor modules 22, 55 which may be permanently connected to the vehicle axle 2 and are assigned to a sensor arrangement 5.

In addition, an acceleration sensor 70 with an acceleration sensor supply connection 70a can be provided in the sensor arrangement 5 as a further sensor module which may be fixed to the axle, which acceleration sensor supply connection 70a is supplied with energy via an acceleration sensor line 75, wherein the acceleration sensor line 75 is for this purpose also electrically coupled to the second fixed point 30 which may be fixed to the axle, in order to be supplied with energy from the same energy supply unit 40 as the other sensor modules 50, 22 which may be fixed to the axle.

In addition, a second rotational speed sensor 60 with a second rotational speed sensor supply connection 60a can be provided as a further sensor module, fixed to the axle, of the sensor arrangement 5 on the opposite wheel 3 of the vehicle axle 2, which rotational speed sensor supply connection 60a is connected to the second fixed point 30, fixed to the axle, via a second rotational speed sensor line 65, in order to ensure thereby a supply of energy also from the energy supply unit 40. As a result, it is also not necessary to lay a further load-stable supply line 31 from the brake control device 7 on the chassis 4 to the vehicle axle 2 for the second rotational speed sensor 60.

The second fixed point 30 which may be fixed to the axle can be embodied, for example, as plug-type connector into which the supply line 31, the axle module line 25 and the rotational speed sensor line 55 and, if appropriate, the further sensor module lines 65, 75 leading to the further supply connections 60a, 70a are plugged. Alternatively, the supply line 31 can also be soldered to the respective sensor module lines 25, 55, 65, 75 at the second fixed point 30 which may be fixed to the axle or can be connected to one another by another type of connection which permits distribution of the energy.

The supply line 31 and the corresponding sensor module lines 25, 55, 65, 75 leading to the respective supply connections 22a, 50a, 60a, 70a of the sensor modules 22, 50, 60, 70 which may be fixed to the axle, in certain embodiments, have two conductors here, in order in the simplest case to permit connection to a two-pole energy supply unit 40 and therefore transmission of a voltage or of a current. At the same time, in the two-conductor design it is possible, for example by modulating the current by employing a corresponding data protocol or a power-line communication (PLC), for data transmission also to take place at the same time as the supply of energy.

In this way, for example the rotational speed signal SD which is output by the respective rotational speed sensor 50, 60 which is fixed to the axle can be transmitted to the brake control device 7, which is fixed to the axle, for further processing. The data which is processed by the axle module 22 which may be fixed to the axle, i.e. for example the measured receiver field strength F2 and/or the distance A which is derived therefrom, which data is normally transmitted back in a wireless fashion to the chassis module 21 by employing the radio signal SF, can also be transmitted in a correspondingly modulated fashion to the chassis 4 in a wire-bound fashion in a ride height signal SH via the axle module line 25 and the supply line 31. As a result, the formation of a high-frequency back channel between the axle module 22 and the chassis module 21 can be dispensed with. The ride height signal SH can then be transmitted, e.g. from the brake control device 7 via a network, for example a CAN bus, or via a direct connection to the ride level control device 10a, for further processing and control.

A further modulation of the current does not have any influence here on the energy supply of the respective sensor modules 22, 50, 60, 70 which are fixed to the axle. On the other hand, the axle module 22, which is supplied with energy by the energy supply unit 40 in the brake control device 7, of the ride height sensor 20 requires so little energy compared with, for example, the rotational speed sensors 50, 60, that it is not expected that the quality of the rotational speed signal SD which is transmitted in a current-modulated fashion will be affected by the branching off of energy to the axle module 22. Therefore, during the modulation of the current it is still possible to achieve a good signal quality and at the same time minimize the expenditure on cabling further.

Figure 3:
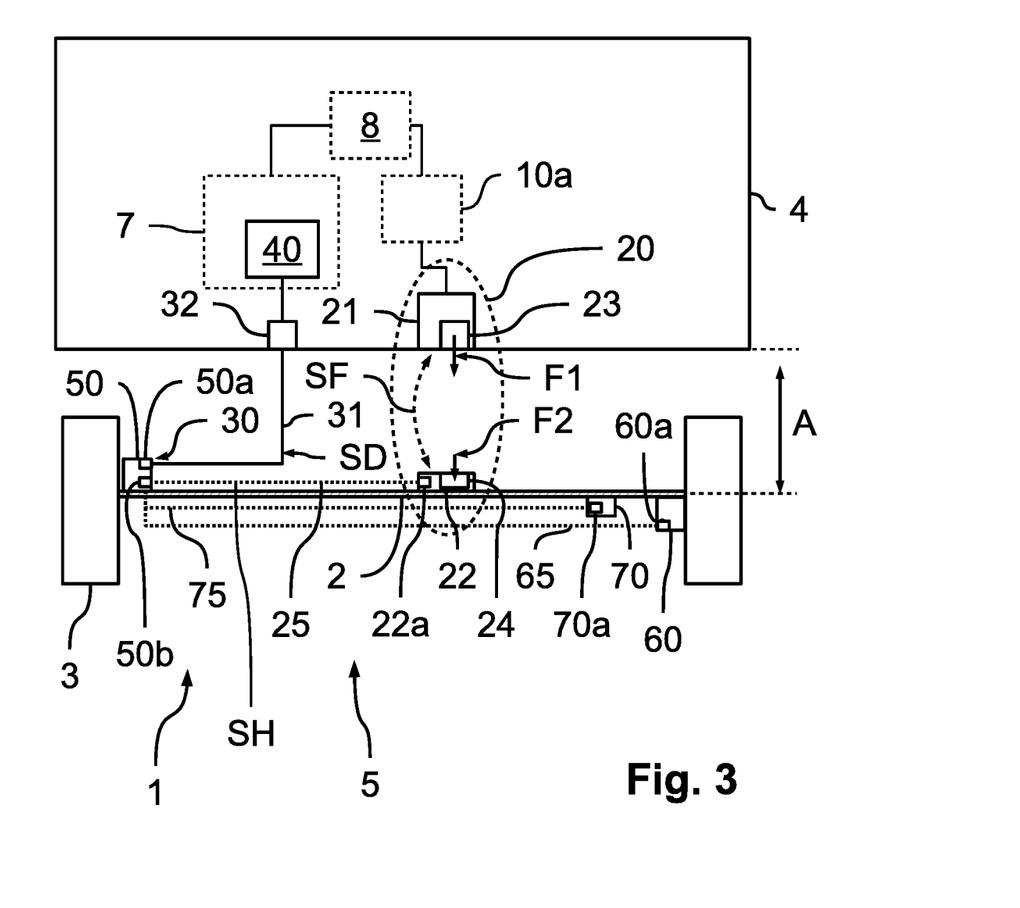
FIG. 3 shows a second embodiment of a sensor arrangement according to the disclosure.

According to an alternative embodiment illustrated in FIG. 3, the second fixed point 30 which may be fixed to the axle is located on the rotational speed sensor 50. The load-stable supply line 31 is accordingly routed directly to the rotational speed sensor supply connection 50a on the rotational speed sensor 50 which may be fixed to the axle and may be permanently connected to the rotational speed sensor supply connection 50a, in order to supply it with energy and at the same time permit current-modulated transmission of data, in certain embodiments, of the rotational speed signal SD. The axle module line 25 leading to the axle module 22 and the furthest sensor module lines 65, 75 leading to the further sensor modules 60, 70 which are fixed to the axle are accommodated in a branch connection 50b which is arranged on the rotational speed sensor 50. In the rotational speed sensor 50, the rotational speed sensor supply connection 50a is connected in an energy-conducting fashion to the branch connection 50b, in order to ensure an energy-conducting connection between the second fixed point 30, which may be fixed to the axle, of the supply line 31 and the sensor modules 22, 60, 70, which may be fixed to the axle, and/or the respective supply connections 22a, 60a, 70a, and in this way ensure a supply of energy. Furthermore, it is also possible to achieve in this way a transmission of data, for example by employing the ride height signal SH, by modulating the current.

However, alternatively the supply line 31 can also be routed to one of the other sensor modules 22, 60, 70 which are fixed to the axle, so that the second fixed point 30 which may be fixed to the axle is located on one of these sensor modules 22, 60, 70. In a corresponding way, the distribution of the energy to the individual sensor modules 22, 50, 60, 70 then takes place via the branch connection and the sensor module lines as described above.

The embodiments according to FIG. 2 and FIG. 3 therefore have in common that energy is transmitted via a single load-stable supply line 31 from the chassis 4, i.e. from the first fixed point 32 which is fixed to the chassis and is connected to the common energy supply unit 40 in the brake control device 7, to the second fixed point 30 which is fixed to the axle, and a supply of energy to a plurality of sensor modules 22, 50, 60, 70, fixed to the axle, of the sensor arrangement 5 occurs from the second fixed point 30 which is fixed to the axle.

LIST OF REFERENCE SYMBOLS (PART OF THE DESCRIPTION):

1 vehicle
2 vehicle axle
3 wheel
4 chassis
5 sensor arrangement
7 brake control device
8 energy source
10 ride level control system
10a ride level control device
20 ride height sensor
21 chassis module
22 axle module
22a axle module supply connection
23 transmitter coil
24 receiver coil
25 axle module line
30 second fixed point
31 supply line
32 first fixed point
40 energy supply unit
50 rotational speed sensor
50a rotational speed sensor supply connection
50b branch connection
55 rotational speed sensor line
60 second rotational speed sensor
60a second rotational speed sensor supply connection
65 second rotational speed sensor line
70 acceleration sensor
70a acceleration sensor supply connection
75 acceleration sensor line
A distance between chassis and vehicle axle
F1 transmission field strength
F2 receiver field strength
SD rotational speed signal
SF high-frequency radio signal
SH ride height signal The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A control device for a vehicle comprising vehicle axles, a chassis, and at least two sensor modules, the control device comprising:
    an energy supply unit;
    wherein the control device is configured to supply energy to the at least two sensor modules via the energy supply unit,
    wherein the at least two sensor modules are permanently connected to one of the vehicle axles of the vehicle,
    wherein the control device is permanently connected to the chassis of the vehicle, and the control device serves to supply energy to the at least two sensor modules via only one supply line which runs between the chassis and the one of the vehicle axles, and
    wherein the only one supply line includes two conductors, and the control device is configured to receive and process signals which are generated by at least one of the at least two sensor modules and transmitted via the only one supply line, wherein at least one of the at least two sensor modules are configured to generate the signals by modulating the current which is transmitted via the only one supply line, and wherein the current serves at the same time to supply energy to the at least two sensor modules.

2. The control device as claimed in claim 1, wherein at least one of the at least two sensor modules which are to be supplied with energy via the energy supply unit, on the vehicle comprises:
    a rotational speed sensor for measuring a rotational behavior of a wheel on the vehicle axle;
    an axle module of a ride height sensor for measuring a variable which is configured to determine a distance between the chassis and the vehicle axle of the vehicle; or
    an acceleration sensor.

3. The control device as claimed in claim 2, wherein at least one of the at least two sensor modules which are to be supplied with energy via the energy supply unit is the rotational speed sensor, and another of the at least two sensor modules is the axle module of the ride height sensor.

4. The control device as claimed in claim 1, wherein the control device is a brake control device for actuating brakes of the vehicle or a ride level control device for actuating an air spring system for raising or lowering the chassis of the vehicle.

5. The control device as claimed in claim 1, wherein the at least two sensor modules which are configured to be supplied with energy by the energy supply unit of the control device are configured in such a way that the current which is received by the at least two sensor modules does not influence the signals which are generated by modulating the current.

6. The control device as claimed in claim 1, wherein the control device can be connected to an energy source in the vehicle in order to make available energy to the energy supply unit which is arranged in the control device.

7. A vehicle, comprising:
    vehicle axles;
    a chassis;
    a sensor arrangement; and
    a control device comprising an energy supply unit;
    wherein the sensor arrangement comprises at least two sensor modules which are permanently connected to the vehicle axle of the vehicle and each comprises a supply connection for providing energy into the respective sensor module;
    wherein the supply connection of one of the at least two sensor modules is energy-conductively connected to the energy supply unit of the control device in order to supply energy to the one of the at least two sensor modules which is permanently connected to the vehicle axle; and
    wherein the supply connection of the other sensor module which is permanently connected to the vehicle axle is also energy-conductively connected to the energy supply unit of the control device in order to supply energy at the same time, via the same energy unit of the control device, to the at least two sensor modules which are permanently connected to the vehicle axle,
    wherein the control device is permanently connected to the chassis, and the supply connections of the at least two sensor modules which are permanently connected to the vehicle axle are energy-conductively connected to the energy supply unit of the control device via a single supply line which connects the chassis to the vehicle axle, and wherein the supply line energy-conductively connects a first fixed point, which is permanently connected to the chassis, to a second fixed point, which is permanently connected to the vehicle axle.

8. The vehicle as claimed in claim 7, wherein at least one of the at least two sensor modules comprises:
a rotational speed sensor for measuring a rotational behavior of a wheel on the vehicle axle;
an axle module of a ride height sensor for measuring a variable which is configured to determine a distance between the chassis and the vehicle axle of the vehicle; or
an acceleration sensor.

9. The vehicle as claimed in claim 8, wherein at least one of the at least two sensor modules which is to be supplied with energy via the energy supply unit is the rotational speed sensor and another of the at least two sensor modules is the axle module of the ride height sensor.

10. The vehicle as claimed in claim 9, wherein the ride height sensor comprises a contactless ride height sensor, wherein the contactless ride height sensor comprises a chassis module which is permanently connected to the chassis and the axle module which is permanently connected to the vehicle axle and is supplied with energy via the energy supply unit of the control device.

11. The vehicle as claimed in claim 7, wherein the second fixed point is energy-conductively connected to the respective supply connections on the at least two sensor modules via a first sensor module line and via a second sensor module line.

12. The vehicle as claimed in claim 11, wherein the second fixed point is a plug-type connection, and wherein the supply line and the first and second sensor module lines are plugged into the plug-type connection on the second fixed point.

13. The vehicle as claimed in claim 11, wherein the second fixed point comprises a soldered connection, and wherein the supply line and the first and second sensor module lines are soldered to the second fixed point.

14. The vehicle as claimed in claim 7, wherein the second fixed point is located on one of the at least two sensor modules, and wherein the supply line is directly connected to the supply connection of the one sensor module, in order to supply the one sensor module with energy.

15. The vehicle as claimed in claim 14, wherein the one sensor module has a branch connection, wherein the branch connection is energy-conductively connected to the supply connection, and the supply connections on the other of the at least two sensor modules of the sensor arrangement are energy-conductively connected to the branch connection via a sensor module line.

16. The vehicle as claimed in claim 15, wherein the branch connection and the supply connection on the one sensor module are combined.

17. A vehicle, comprising:
vehicle axles;
a chassis;
a sensor arrangement; and
a control device comprising an energy supply unit;
wherein the sensor arrangement comprises at least two sensor modules which are permanently connected to the vehicle axle of the vehicle and each comprises a supply connection for providing energy into the respective sensor module;
wherein the supply connection of one of the at least two sensor modules is energy-conductively connected to the energy supply unit of the control device in order to supply energy to the one of the at least two sensor modules which is permanently connected to the vehicle axle;
wherein the supply connection of the other sensor module which is permanently connected to the vehicle axle is also energy-conductively connected to the energy supply unit of the control device in order to supply energy at the same time, via the same energy unit of the control device, to the at least two sensor modules which are permanently connected to the vehicle axle; and
wherein a supply line comprises two conductors, to transmit current and/or voltage in a bipolar fashion to the at least two sensor modules, wherein signals which are generated by at least one of the at least two sensor modules can also be transmitted via the two-conductor supply line, and wherein at least one of the at least two sensor modules are configured to generate the signals by modulating a current which is transmitted via the supply line, and the current serves at the same time to supply energy to the at least two sensor modules, and the at least two sensor modules which are configured to be supplied with energy by the energy supply unit of the control device are configured in such a way that the current which is received by the at least two sensor modules does not influence the signals which are generated by the modulating of the current.

* * * * *